US008683154B2

(12) United States Patent
Kono et al.

(10) Patent No.: US 8,683,154 B2
(45) Date of Patent: Mar. 25, 2014

(54) COMPUTER SYSTEM AND SYSTEM CONTROL METHOD

(75) Inventors: Misako Kono, Yokohama (JP); Nobuhiro Maki, Yokohama (JP); Hironori Emaru, Yokohama (JP); Masayasu Asano, Yokohama (JP); Junichi Hara, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 364 days.

(21) Appl. No.: 12/988,546

(22) PCT Filed: Aug. 6, 2010

(86) PCT No.: PCT/JP2010/063405

§ 371 (c)(1), (2), (4) Date: Oct. 19, 2010

(87) PCT Pub. No.: WO2011/158386

PCT Pub. Date: Dec. 22, 2011

(65) Prior Publication Data

US 2011/0314239 A1 Dec. 22, 2011

(30) Foreign Application Priority Data

Jun. 17, 2010 (JP) ................................ 2010-138464

(51) Int. Cl.
*G06F 12/00* (2006.01)

(52) U.S. Cl.
USPC ............ 711/162; 711/100; 711/154; 711/161

(58) Field of Classification Search
USPC ................................ 711/100, 154, 161, 162
See application file for complete search history.

(56) References Cited

U.S. PATENT DOCUMENTS

2003/0131278 A1 7/2003 Fujibayashi
2005/0038968 A1 2/2005 Iwamura et al.
2006/0218203 A1 9/2006 Yamato et al.
2007/0033355 A1 2/2007 Maki et al.
2007/0050575 A1 3/2007 Uratani et al.
2007/0198791 A1 * 8/2007 Iwamura et al. .............. 711/162
2007/0271430 A1 11/2007 Maki et al.
2008/0065843 A1 3/2008 Bartfai et al.
2009/0077134 A1 3/2009 Ueoka et al.
2009/0248759 A1 10/2009 Okada et al.
2010/0036896 A1 2/2010 Nakagawa et al.

FOREIGN PATENT DOCUMENTS

JP 2003-242011 A 8/2003
JP 2005-62928 A 3/2005
JP 2006-268740 A 10/2006

(Continued)

*Primary Examiner* — Midys Rojas
(74) *Attorney, Agent, or Firm* — Mattingly & Malur, PC

(57) ABSTRACT

Operation of an environment that supports both host-based replication and array-based replication is realized. According to the present invention, data in the first storage area is copied first to the second storage area using an array-based replication engine. In this case, the execution result of the replication is managed using a flag from which the copy timing can be known. In addition, data in the first storage area is copied to the third storage area using a host-based replication engine, and further, data in the third storage area is copied to the fourth storage area. Then, when data in the second storage area is restored to the first storage area, data in the fourth storage area is returned to the third storage area so that the third storage area has data of the same time as the second storage area (see FIG. 12).

10 Claims, 18 Drawing Sheets

(56) References Cited

FOREIGN PATENT DOCUMENTS

| | | | |
|---|---|---|---|
| JP | 2007-47892 | A | 2/2007 |
| JP | 2007-66192 | A | 3/2007 |
| JP | 2007-310448 | A | 11/2007 |
| JP | 2008-123529 | A | 5/2008 |
| JP | 2009-070143 | A | 4/2009 |
| JP | 2009-230628 | A | 10/2009 |
| JP | 2010-503089 | A | 1/2010 |
| JP | 2010-39986 | A | 2/2010 |

* cited by examiner

FIG. 6

| Host ID (5070) | Application ID (5071) | Storage ID (5072) | Volume ID (5073) | Usage Status (5074) |
|---|---|---|---|---|
| HOST001 | AP001 | ST001 | VOL001 | Used |
| | AP002 | ST001 | VOL002 | Used |
| | - | ST001 | VOL003 | Used |
| | - | ST001 | VOL004 | Used |
| | - | ST001 | VOL005 | Used |
| | AP003 | ST001 | VOL006 | Used |
| | - | ST001 | VOL007 | - |
| HOST002 | - | - | VOL011 | Used |
| | - | - | VOL012 | Used |
| | - | - | VOL013 | - |
| ... | ... | ... | ... | ... |

FIG. 7

| System Device ID (5080) | Replication Function (5081) |
|---|---|
| HOST001 | Asynchronous Remote Replication |
| HOST002 | Host-Based CDP |
| ST001 | Full Backup |
| | Differential Backup |
| Switch | N/A |
| ... | ... |

FIG. 8

| Replication ID (5090) | Application ID (5091) | Type (5092) | Schedule (5093) | Data VOL ID (5094) | Backup VOL ID (5095) |
|---|---|---|---|---|---|
| ARP001 | AP001 | Full Backup | Everyday at 23:00 | VOL001 | VOL003 |
| | | | | | VOL004 |
| ARP002 | AP002 | Differential Backup | Once Every Hour | VOL002 | VOL005 |
| ... | ... | ... | ... | ... | ... |

FIG. 9

| Replication ID (5100) | Application ID (5101) | Type (5102) | Data VOL ID (5103) | Target Host ID (5104) | Replica VOL ID (5105) |
|---|---|---|---|---|---|
| HRP001 | AP001 | Asynchronous Remote Replication | VOL001 | HOST002 | VOL011 |
| HRP002 | AP003 | Asynchronous Remote Replication | VOL006 | HOST002 | VOL012 |
| ... | ... | ... | ... | ... | ... |

FIG. 10

| Replication Catalog ID (5110) | Time (5111) | Replication ID (5112) | Data VOL ID (5113) | Backup VOL ID (5114) |
|---|---|---|---|---|
| ARPC001 | 04/20/2010 23:00:00 | ARP001 | VOL001 | VOL003 |
| ARPC002 | 04/21/2010 22:30:00 | ARP002 | VOL002 | VOL005 |
| ARPC003 | 04/21/2010 23:00:00 | ARP001 | VOL001 | VOL004 |
| ... | ... | ... | ... | ... |

FIG. 11

| Replication Catalog ID (5120) | Replication ID (5121) | Creation Time (5122) | Replica VOL ID (5123) | Secondary-Replica-Data Storage Area (5124) | Backup Flag (5125) |
|---|---|---|---|---|---|
| HRPC001 | HRP001 | 04/21/2010 22:55:00 | VOL011 | SSVOL001 | 04/21/2010 23:00:00 |
| HRPC002 | HRP001 | 04/21/2010 23:00:00 | VOL011 | SSVOL002 | 04/21/2010 23:00:00 |
| HRPC003 | HRP001 | 04/21/2010 23:10:00 | VOL011 | SSVOL003 | 04/22/2010 23:00:00 |
| ... | ... | ... | ... | ... | ... |

COMPUTER SYSTEM AND SYSTEM CONTROL METHOD

CLAIM OF PRIORITY

The present application is a 371 of International Application PCT/JP2010/063405 filed on Aug. 6, 2010 and claims priority from Japanese patent application JP 2010-138464 filed on Jun. 17, 2010, the content of which are hereby incorporated by reference into this application.

TECHNICAL FIELD

The present invention relates to a computer system and a system control method. For example, the invention relates to controlling a replication process in a storage system and a computer.

BACKGROUND ART

A replication technique for replicating data is known as a measure to protect against data loss. Among processes that use the replication technique are backup and disaster recovery (DR). A storage area in which data on an application is stored is called a data volume. Backup refers to the process of storing data in the data volume at a given point in time and storing it for a long period of time. DR refers to the process of constantly replicating data in the data volume so that the replicated data can be used in other systems.

Examples of replication include host-based replication performed on a host computer and array-based replication performed on a storage system.

In the host-based replication, Write data (data to be written) to be written to a data volume from an application is captured to create a replica volume that has stored therein the same data as the data volume. As the Write data from the application is written to a medium by transfer, the host-based replication can accommodate a heterogeneous environment without dependence on the storage devices. Further, the replica volume can be created at low cost.

In the array-based replication, a replica volume is created using a replication function of the storage. This allows creation of a replica volume that maintains the consistency among of a plurality of hosts without imposing load on the hosts.

As disclosed in Patent Document 1, there is known an environment that supports both host-based replication and storage-based replication. When such an environment is used, it is possible to effectively use their respective advantages. For example, when attempting to acquire backup data that maintains the consistency among a plurality of hosts, the administrator performs a backup operation using local-array-based replication. Meanwhile, when attempting to perform DR operation at low cost by utilizing the existing resources, the administrator would consider DR operation using host-based replication. As described above, an administrator who desires to perform an operation using both host-based replication and array-based replication is envisaged.

Patent Document 1: JP Patent Publication No. 2005-062928

DISCLOSURE OF THE INVENTION

Problems to be Solved by the Invention

However, although the host-based replication captures Write data to be written to a data volume from an application, it cannot capture Write data to be written to the data volume generated in a restoration process of the array-based replication. Therefore, in an environment that supports both host-based replication and array-based replication, when backup data is restored by the array-based replication (when the data is restored to a primary volume in the storage system using a replica volume (also referred to as a secondary volume or a backup volume)), the data content of the replica volume used in the host-based replication could differ from the data content of the primary volume. At this time, the application on the host computer recognizes that the data content of the primary volume in the storage system is the same as that when restoration was performed. Therefore, when the host-based replication continuously captures Write data from the application and reflects it into the replica volume, a problem would arise that data in the replica volume used in the host-based replication could be damaged.

The present invention has been made in view of the foregoing circumstances, and provides a technique for, when a process of restoring the primary volume is performed, maintaining the consistency between the data content of the primary volume and the data content of the replica volume that is used in the host-based replication.

Means for Solving the Problems

In order to solve the aforementioned problems, the present invention proposes a method for managing replication that realizes an environment that supports both array-based replication and host-based replication. Specifically, data in a first storage area (a primary volume in the storage system) is copied to a second storage area (a secondary volume in the storage system) using an array-based replication engine (i.e., a backup is created and stored). At this time, the execution result of the replication is managed using a flag from which the backup timing can be known. A first host computer copies data to be written to the first storage area to a third storage area in a second host computer using the host-based replication engine to create a replica volume. Further, data in the third storage area (the replica volume) is copied to a fourth storage area to create a secondary replica volume. Then, when data in the second storage area is restored to the first storage area, data in the fourth storage area (the secondary replica volume) is returned to the third storage area (the replica volume) so that the third storage area has the same data as the data in the second storage area used in the restoration process.

Further features of the present invention will be described with reference to the following environments for implementing the present invention and the accompanying drawings.

Advantages of the Invention

According to the present invention, an environment that supports both host-based replication and array-based replication can be realized. With the realization of such an environment, it is possible to accommodate a heterogeneous environment without dependence on the types or properties of storage devices, and to operate low-cost replication that maintains the consistency among a plurality of host computers without imposing load on the host computers.

BRIEF DESCRIPTION OF THE DRAWINGS

FIG. 6 is a diagram showing an exemplary configuration of a configuration information table.

FIG. 7 is a diagram showing an exemplary configuration of a replication information table.

FIG. 8 is a diagram showing an exemplary configuration of an array-based replication management table.

FIG. 9 is a diagram showing an exemplary configuration of a host-based replication management table.

FIG. 10 is a diagram showing an exemplary configuration of an array-based replication catalog table.

FIG. 11 is a diagram showing an exemplary configuration of a secondary replica catalog table.

DESCRIPTION OF SYMBOLS

Figure 1:
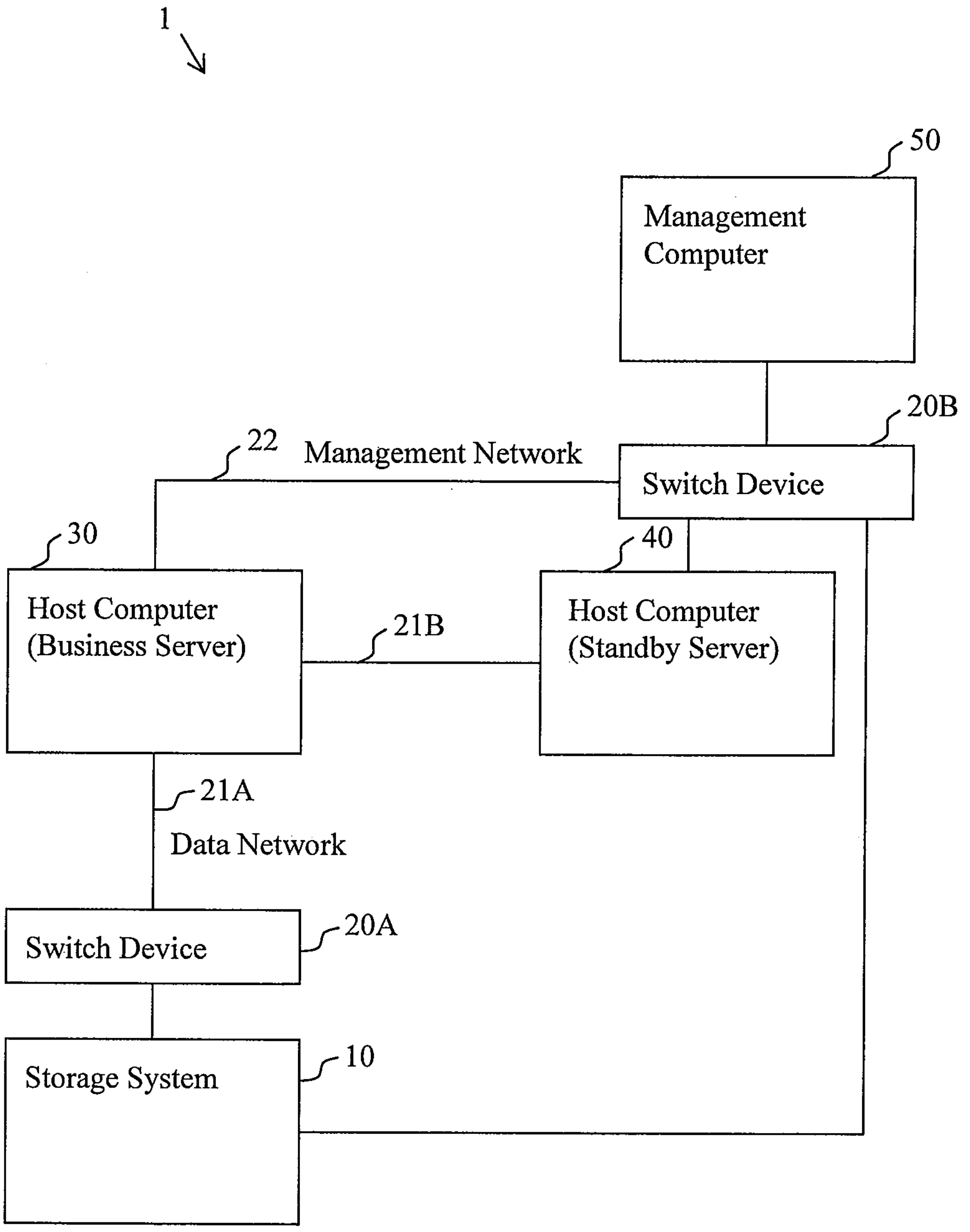
FIG. 1 is a block diagram showing the schematic configuration of a computer system 1.

1, 1B, 1C computer system
10 storage system
11 storage controller
12 storage device
20 switch device
21 data network
22 management network
30 host computer (business server)
40 host computer (standby server)
50 management computer
110, 303, 308, 403, 408 data I/F
111, 302, 402, 502 CPU
112 storage I/F
113, 309, 409, 503 management I/F
114, 304, 404, 504 memory
115 storage microprogram
116 array-based replication engine
120 physical resource
121 pool
300, 400, 500 input device
301, 401, 501 display device
305, 405 application
306 host-based replication engine
307, 407 storage area
406 replication engine
506 replication management program
507 configuration information table
508 replication information table
509 array-based replication management table
510 host-based replication management table
511 array-based replication catalog table
512 secondary replica catalog table

BEST MODES FOR CARRYING OUT THE INVENTION

Hereinafter, embodiments of the present invention will be described with reference to the accompanying drawings. It should be noted that the embodiments are merely illustrative for the purpose of implementing the present invention and are not intended to limit the technical scope of the present invention. Structures that are common throughout the drawings are assigned identical reference numbers.

In the following description, information of the present invention will be represented by an "aaa table." However, such information need not necessarily be represented by the data structure of a table, and can also be represented by the data structure of a list, DB, queue, or the like. Therefore, the "aaa table," "aaa list," "aaa DB," "aaa queue," or the like may also be referred to as "aaa information" to show that such information does not depend on the data structure.

In describing the content of each information, expressions such as "identification information," "identifier," "name," "appellation" and "ID" can be used. Such expressions are interchangeable.

In the following description, each operation is described as being performed by a "program." However, since it is only after a program is executed by a processor that the program can perform a given process using memory or a communication port (a communication control device), each operation can also be described as being performed by a processor. Further, a process disclosed as being performed by a program can also be performed by a computer such as a management server or an information processing device. Further, part or the whole of a program can be implemented by dedicated hardware or implemented as a module. A variety of programs can be installed on each computer via a program distribution server or a storage medium.

(1) First Embodiment

<Entire System Configuration>

FIG. 1 is a block diagram showing the schematic configuration of a computer system 1 in accordance with the first embodiment of the present invention. As shown in FIG. 1, the computer system 1 in accordance with this embodiment includes a storage system 10, a switch device 20, a host computer (a business server) 30, a host computer (a standby server) 40, and a management computer 50.

The storage system 10 and the host computer (the business server) 30 are connected to a data network 21A via a switch device 20A from each data interface. In this embodiment, the data network 21A is a storage network (SAN). However, the data network 21A can be an IP (Internet Protocol) network or any other types of data communication networks.

The host computer (the business server) 30 and the host computer (the standby server) 40 are connected to each other via a data network 21B from each data interface. In this embodiment, the data network 21B is an IP network. However, the data network 21B can be a storage network or any other types of data communication networks. Although the host computer 40 in this embodiment is operated as a standby server for storing and managing a replica volume as described previously, the host computer 40 can be another business server having about the same performance and configuration as the host computer 30. In that case, a plurality of host computers (business servers) is configured to store and manage a replica volume of a primary volume that is used by an application of another host computer.

The storage system 10, the host computer (the business server) 30, the host computer (the standby server) 40, and the management computer 50 are connected to a management network 22 via a switch device 20B from each management interface. In this embodiment, the management network 22 is an IP network. However, the management network 22 can be a SAN or any other types of data communication networks. Alternatively, the data networks 21 and the management network 22 can be a common network. Further, the switch device 20A and the switch device 20B can be a common device. It should be noted that the host computer (the business server) 30, the host computer (the standby server) 40, and the management computer 50 can be configured as a common computer. Furthermore, although the computer system 1 includes a single storage system 10, two host computers, and a single management computer 50, the number of each component is not limited.

<Internal Configuration of the Storage System>

Figure 2:
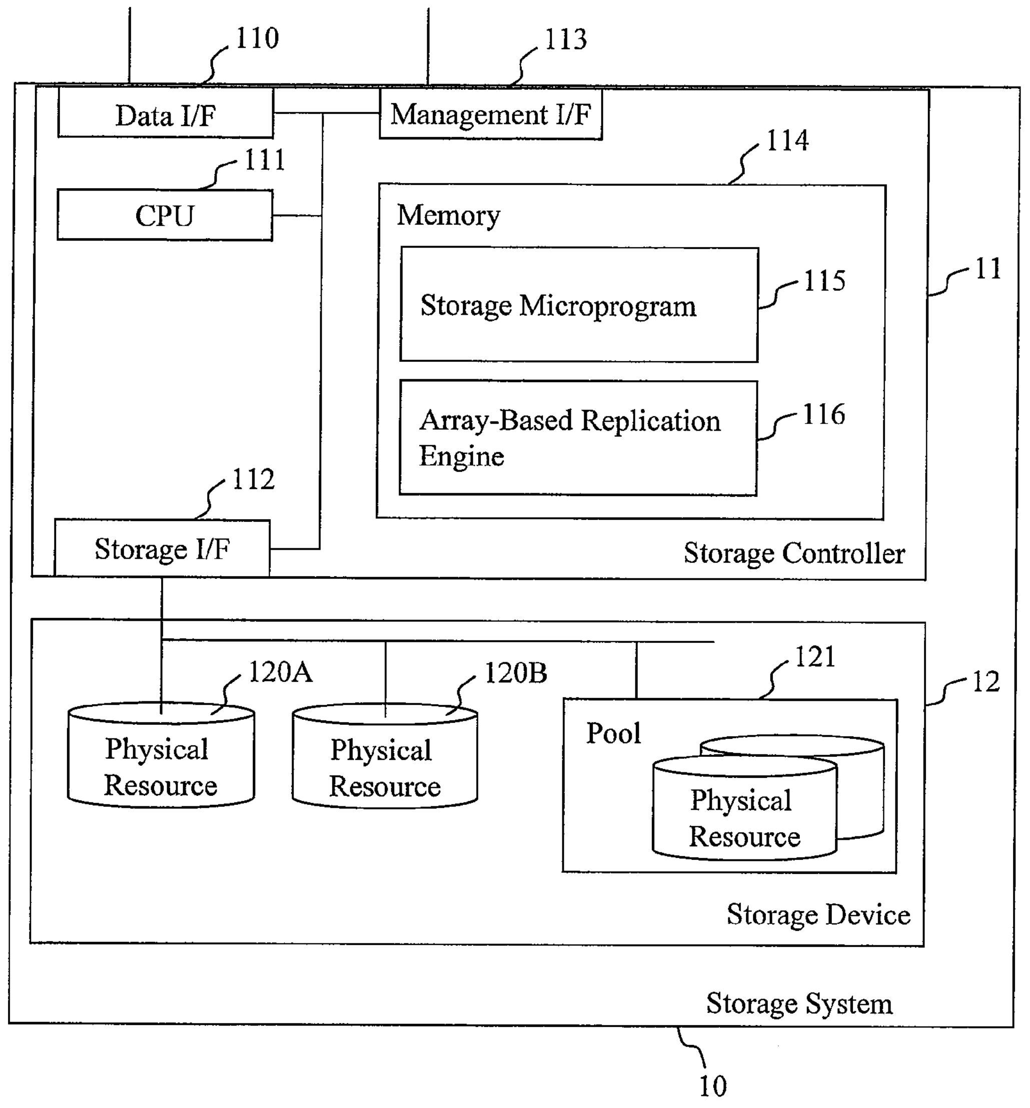
FIG. 2 is a block diagram showing an exemplary internal configuration of a storage system 10.

FIG. 2 is a diagram showing the internal configuration of the storage system 10 in accordance with the embodiment of the present application. The storage system 10 includes a storage controller 11 that controls the entire storage system 10 and a storage device 12 for storing data. The storage controller 11 and the storage device 12 are connected via a storage I/F 112.

The storage controller 11 includes a data I/F 110, a CPU (Central Processing Unit) 111, a storage UF 112, a management UF 113, and memory 114. The data UF 110 is an interface to the data network 21A, and has one or more communication ports. The storage controller 11 transmits and receives data to/from the host computer (the business server) 30 via the port(s). The CPU 111 is a processor that executes programs stored in the memory 114. The storage I/F 112 is an interface to the storage device 12. Transmission and reception of data or control instructions are performed via the storage I/F 112. The management I/F 113 is an interface to the management network 22, and has one or more communication ports. The storage controller 11 can transmit and receive data or control instructions to/from the host computer (the business server) 30, the host computer (the standby server) 40, the management computer 50, and other storage systems via the port(s).

The memory 114 has stored therein a storage microprogram 115 and an array-based replication engine 116. The storage microprogram 115 is a program that manages the storage device 12 and is executed by the CPU 111 to implement a function of letting the host computer (the business server) 30 recognize a volume(s). Herein, the function of letting the host computer (the business sever) 30 recognize a volume(s) refers to a function of collecting physical resources 120 (configuration information) of the storage device 12 and providing (informing) the host computer (the business server) 30 with (of) the physical resources 120 as one or more logical volumes via the FF. Specifically, the configuration information includes a primary volume, a secondary volume, RAID configuration, and information about the usage status of the volume (which application accesses the volume). Such information is collected periodically, when requested by the administrator, or when a change in the configuration has occurred, for example.

The array-based replication engine 116 is a program that implements the replication function of the storage system 10. Herein, the replication function of the storage system is a function of copying data in a logical volume into another logical volume. For example, provided that each physical resource 120 in the storage device 12 is a single logical volume, data is copied from the physical resource 120A to the physical resource 120B.

The storage device 12 includes the physical resources 120 and a pool 121. The physical resources 120 are storage areas in which data operated by a computer (e.g., the host computer (the business server) 30) is stored. For example, the physical resource 120A corresponds to the primary volume and the physical resource 120B corresponds to the secondary volume (an array-based replica volume). The physical resource 120 represents a resource of a storage area provided by a physical device such as a HDD (Hard Disk Drive) or a SSD (Solid State Drive). The type of the physical device that provides the physical resource 120 is not particularly limited. The pool 121 is a group of the physical resources 120. Typically, the pool 121 is constructed from the redundant physical resources 120 using a technique called RAID (Redundant Array of Independent Disks). However, the present invention is not limited thereto, and it is acceptable as long as the pool 121 has a group of the physical resources 120. Although a single pool 121 and four physical resources 120 are shown in the drawing, the present invention is not limited thereto, and it is acceptable as long as the number of each component is one or more.

<Internal Configuration of the Host Computer (Business Server)>

Figure 3:
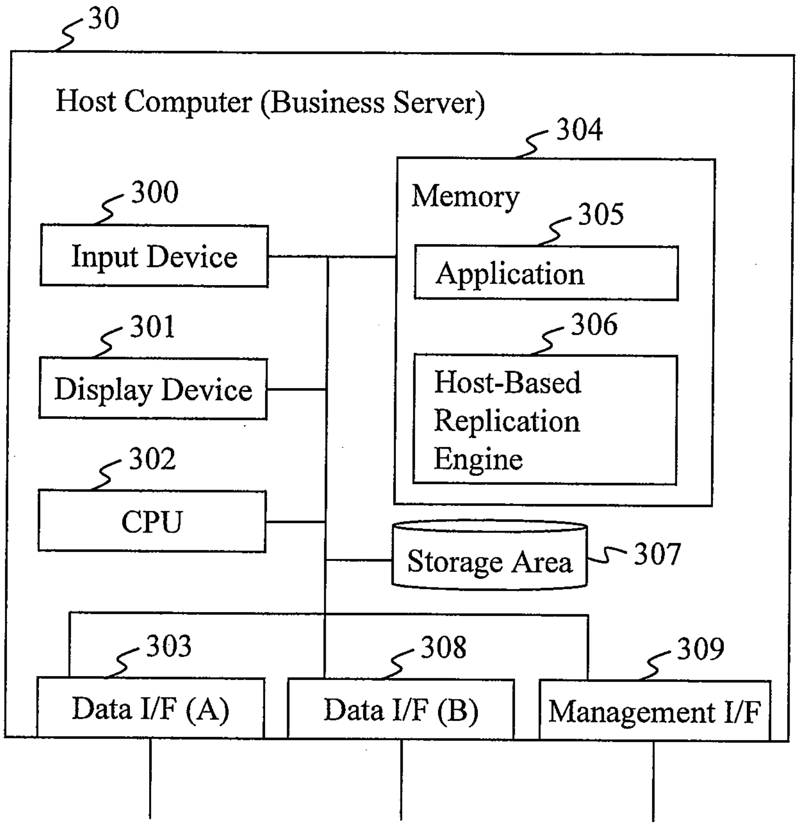
FIG. 3 is a block diagram showing an exemplary internal configuration of a host computer (a business server) 30.

FIG. 3 is a diagram showing the internal configuration of the host computer (the business server) 30 in accordance with the embodiment of the present invention. The host computer (the business server) 30 includes an input device 300 such as a keyboard or a mouse, a display device 301 such as a CRT (Cathode Ray Tube) or a LCD (Liquid Crystal Display), a CPU 302, a data I/F(A) 303, memory 304, a storage area 307, a data I/F(B) 308, and a management I/F 309.

The CPU 302 is a processor that executes programs stored in the memory 304. The data I/F(A) 303 is an interface to the data network 21A, and has one or more communication ports. The host computer (the business server) 30 transmits and receives data to/from the storage system 10 via the port(s).

The memory 304 has stored therein an agent, an application 305, and a host-based replication engine 306, which are executed by the CPU 302. The application 305 is a program that executes a process by reading data from or writing data to the physical resources 120 on the storage device 12. The application 305 is a DBMS (Data Base Management System) or a file system, for example. Although a single application 305 is shown in the drawing, the present invention is not limited to such number. The host-based replication engine 306 implements a function of capturing data to be written to the storage system 10 from the application 305 and transferring the data to the host computer (the standby server) 40 via the data I/F(B) 308. However, such function can be implemented as one of the functions of the application. The agent 310 has a function of collecting the configuration information of the host computer 30 and acquiring information about the relationship between the application 305 and the storage system 10 (e.g., which volume is accessed by the application).

The storage area 307 is an area for storing data on the host computer 30, and can also be used to store data used by the application 305 and the host-based replication engine 306. The data I/F(B) 308 is an interface to the data network 21B, and transmits and receives data or control instructions to/from the host computer (the standby server) 40. The management I/F 309 is an interface to the management network 22, and transmits and receives data or control instructions to the storage system 10, the host computer (the standby server) 40, and the management computer 50 for the purpose of system management.

<Internal Configuration of the Host Computer (the Standby Server)>

Figure 4:
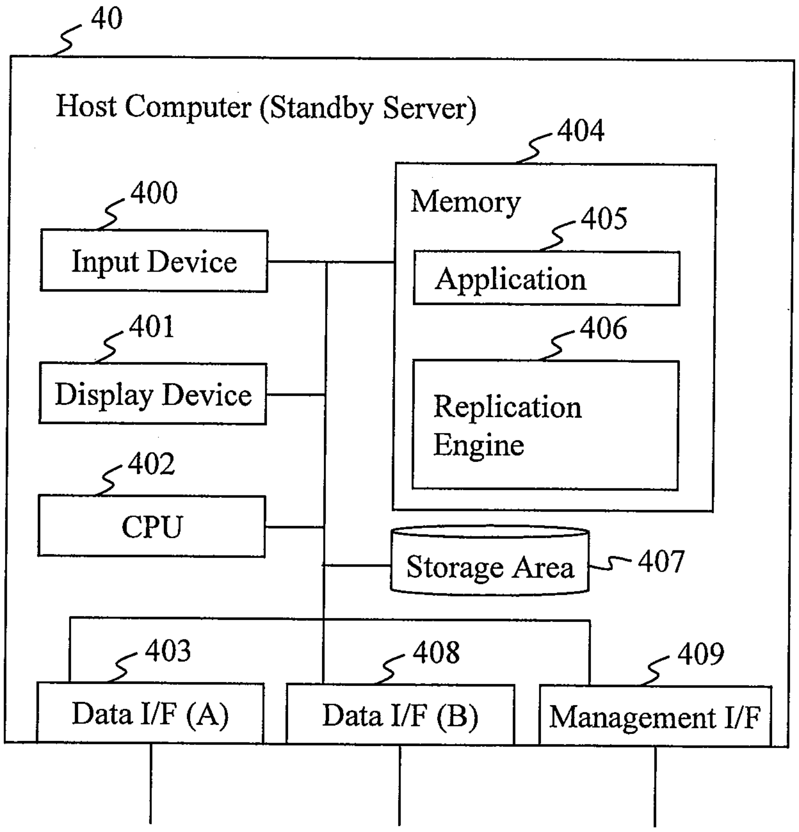
FIG. 4 is a block diagram showing an exemplary internal configuration of a host computer (a standby server) 40.

FIG. 4 is a diagram showing the internal configuration of the host computer (the standby server) 40 in accordance with the embodiment of the present invention. The host computer (the standby server) 40 has a similar configuration to the host computer (the business server) 30, but differs from the business server 30 in that the standby server 40 includes a replication engine 406 capable of executing replication (capable of creating a secondary replica volume as described later) without limitation to the host-based replication engine 306 on the host base.

It should be noted that the replication engine 406 can have a replication function 5081 such as shown in FIG. 7 described later. Alternatively, the replication engine 406 can be configured to manage a differential bitmap of the data volume, identify information on the differential data to be transferred to a replica volume from the differential bitmap information, and transfer the data from the data volume to the replica volume upon completion of the restoration of the data volume by the array-based replication.

<Internal Configuration of the Management Computer>

Figure 5:
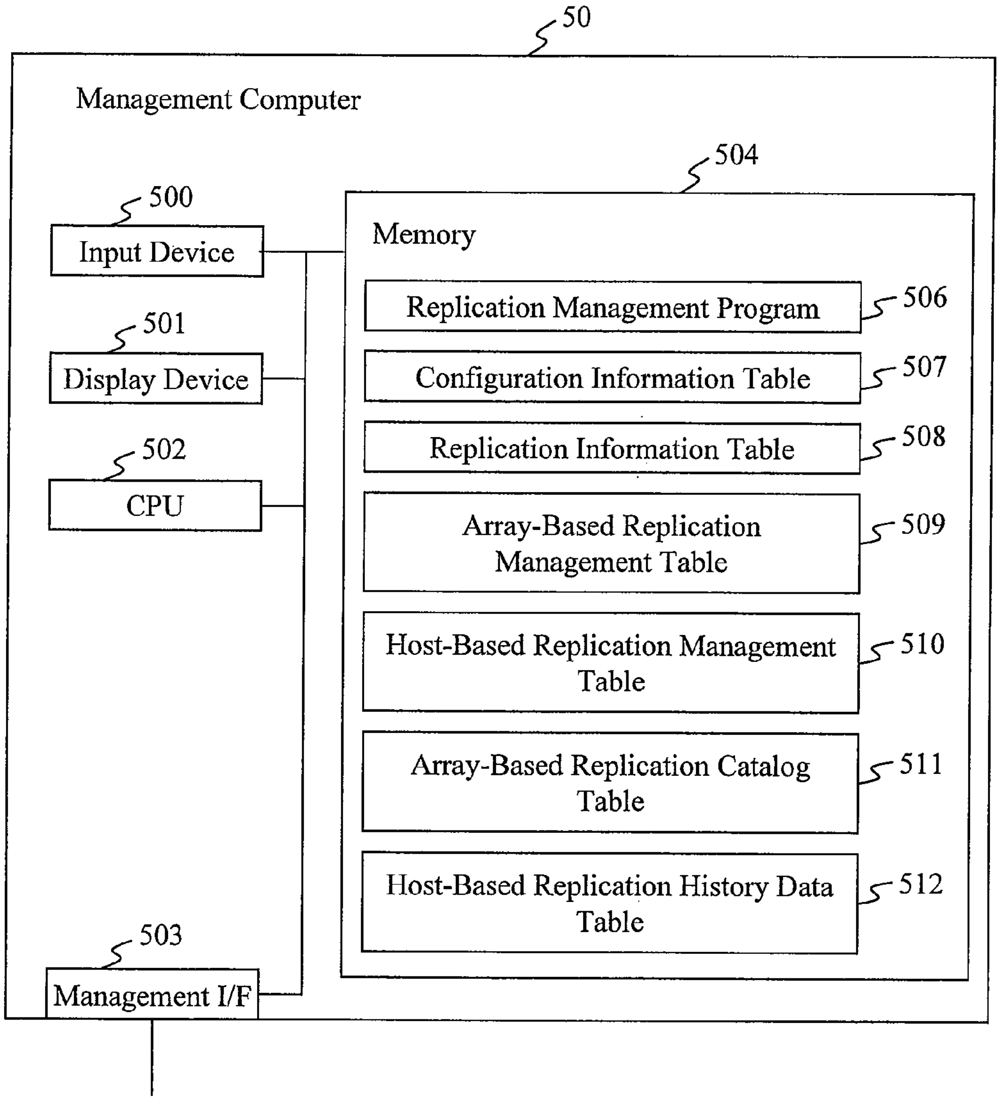
FIG. 5 is a block diagram showing an exemplary internal configuration of a management computer 50.

FIG. 5 is a diagram showing the internal configuration of the management computer 50 in accordance with the embodiment of the present invention. The management computer 50 includes an input device 500 such as a keyboard or a mouse, a display device 501 such as a CRT, a CPU 502, a management I/F 503, and memory 504.

The CPU 502 is a processor that executes programs stored in the memory 504. The management I/F 503 is an interface to the management network 22, and transmits and receives data or control instructions to/from the host computer (the business server) 30, the host computer (the standby server) 40, and the storage system 10 for the purpose of system management. The memory 504 has stored therein a replication management program 506, a configuration information table 507, a replication information table 508, an array-based replication management table 509, a host-based replication management table 510, an array-based replication catalog table 511, and a secondary replica catalog table 512.

The replication management program 506 is implemented by being executed by the CPU 502, and implements the process of the embodiment of the present invention. The replication management program 506 is a program that provides a setup screen to the administrator, acquires information from the host computers 30 and 40 and the storage system 10, controls the replication engines, and manages each table.

The configuration information table 507, the replication information table 508, the array-based replication management table 509, the host-based replication management table 510, the array-based replication catalog table 511, and the host-based replication catalog table 512 will be described later.

As examples of the input device 500 of the management computer 50, a keyboard and a pointer device are considered. However, other devices can also be used. Further, instead of or in addition to the display device 401, other output devices (e.g., a printer) can be provided.

As alternatives to the input device and the display device (output device), it is also possible to use a serial interface or an Ethernet interface as an input/output device, and connect a computer for display that has a display, a keyboard, or a pointer device to the interface, so that information to be displayed is transmitted to the computer for display or information to be input is received from the computer for display, whereby input and display performed by the input/output device can be substituted by displaying information on or receiving information by the computer for display.

Hereinafter, a group of one or more computers that manages the computer system 1 and displays information to be displayed in accordance with the invention of this application may be referred to as a management system. When the management computer 50 displays information to be displayed, the management computer 50 is a management system. A combination of the management computer 50 and the computer for display is also a management system. In order to increase the speed and reliability of the management process, it is also possible to configure a plurality of computers to together implement a process that is about equal to the process of the management computer. In that case, the plurality of computers (including the computer for display when the computer for display is configured to perform display) is a management system.

<Configuration Information Table>

FIG. 6 is a diagram showing an example of the configuration information table 507 in accordance with the embodiment of the present invention. The configuration information table 507 is a table for storing the configuration information of the host computers 30 and 40 and the storage system 10. The configuration information table 507 is referenced by the replication management program 506 executed on the management computer 50.

The configuration information table 507 contains host ID 5070 for identifying the host computers 30 and 40, application ID 5071 for identifying applications on the host computers 30 and 40, storage ID 5072 for identifying the storage system 10, volume ID 5073 for identifying the physical resources 120 in the storage device 12 on the storage system 10, and the usage status 5074 indicating the use sate of the physical resources.

The replication management program 506 acquires information on the host ID 5070, the application ID 5071, and the volume ID 5073 from the host computer 30, and acquires the storage ID 5072, the volume ID 5073, and the usage status 5074 from the storage system 10. Combining such information, the replication management program 506 creates the configuration information table 507. It should be noted that such information can be acquired through an entry by the administrator in advance. Although the column of the usage status 5074 in the example of FIG. 6 indicates "used" and "-" for the sake of convenience, the present invention is not limited to a particular representation method as long as whether the relevant physical resource is being used or not can be identified.

<Replication Information Table>

FIG. 7 is a diagram showing an example of the replication information table 508 in accordance with the embodiment of the present invention. The replication information table 508 is a table for storing information on the replication functions of the devices on the computer system 1. The replication information table 508 is referenced by the replication management program 506 executed on the management computer 50.

The replication information table 508 contains system device ID 5080 for recognizing each system device and a replication function 5081 that resides in the device.

In the example of FIG. 7, function names are described in the column of the replication function 5081 and are represented by "asynchronous remote replication" or "host-based CDP (Continuous Data Protection)." However, the present invention is not limited to a particular representation method as long as replication functions can be identified. In the present item, the function of the array-based replication engine 116 is described as "full backup" and "differential backup." Likewise, the function of the host-based replication engine 306 is described as "asynchronous remote replication" and the function of the replication engine 406 is described as "host-based CDP." However, such function names are only exemplary and the function of each replication engine is not limited to such replication functions.

<Array-Based Replication Management Table>

FIG. 8 is a diagram showing an example of the array-based replication management table 509 in accordance with the embodiment of the present invention. The array-based replication management table 509 is a table for managing backup that uses the array-based replication engine, and is adapted to manage the schedule of the array-based backup (replication) operation. The array-based replication management table 509 is referenced by the replication management program 506 executed on the management computer 50.

The array-based replication management table 509 contains replication ID 5090 for managing replication, application ID 5091 for identifying an application to be backed up, type 5092 for identifying the type of the backup, backup schedule 5093, data VOL ID 5094 that has stored therein data on the application to be backed up, and backup VOL ID 5095 that identifies a backup-destination volume.

When the administrator attempts to backup a given application 305, information on the application ID 5091, the type 5092, the schedule 5093, and the backup VOL ID 5095 is set using the replication management program 506. The replication ID 5090 is provided when set by the administrator, but can also be provided through a manual entry by the administrator. The data VOL ID 5094 is identified from the information on the application 305 set by the administrator. The volume ID 5073 is identified from the application ID 5071 in the configuration information table 507. Alternatively, the administrator can directly set the volume ID 5073 that is the data VOL, or the volume ID can be identified by setting other information that can identify the data VOL. The backup VOL ID 5095 can be set by the administrator. Alternatively, the replication management program 506 can be configured to determine an unused volume with reference to the usage status 5074 in the configuration information table 507.

In the example of FIG. 8, a volume VOL001 that is the volume used by an application AP001 is configured to be alternately backed up to backup volumes VL003 and VOL004 every other day.

In the schedule 5093 in the example of FIG. 8, the time "everyday at 23:00" or the time interval "once every hour" is described. However, any description method can be used as long as the backup start time can be identified.

<Host-Based Replication Management Table>

FIG. 9 is a diagram showing an example of the host-based replication management table 510 in accordance with the embodiment of the present invention. The host-based replication management table 510 is a table for managing replication that uses the host-based replication engine. The host-based replication management table 510 is referenced by the replication management program 506 executed on the management computer 50.

The host-based replication management table 510 contains replication ID 5100 for managing replication, application ID 5101 that identifies an application to be replicated, replication type 5102, data VOL ID 5103 that has stored therein data on the application to be replicated, target host ID 5104 that identifies a replication-destination host, and replica VOL ID 5105 that identifies a replication-destination volume.

When the administrator attempts to replicate data on a given application 305, information on the application ID 5101, the type 5102, the target host ID 5104, and the replica VOL ID 5105 is set using the replication management program 506. The replication ID 5100 is provided by the replication management program 506 when set by the administrator, but can also be provided through a manual entry by the administrator. The data VOL ID 5103 is identified from the information on the application 305 set by the administrator. The volume ID 5073 is identified from the application ID 5071 in the configuration information table 507. Alternatively, the administrator can directly set the volume ID that is the data VOL, or the volume ID can be identified by setting other information that can identify the data VOL. The target host ID 5104 and the replica VOL ID can be set by the administrator. Alternatively, the replication management program 506 can be configured to determine an unused volume with reference to the usage status 5074 in the configuration information table 507.

<Array-Based Replication Catalog Table>

FIG. 10 is a diagram showing an example of the array-based replication catalog table 511 in accordance with the embodiment of the present invention. The array-based replication catalog table 511 is a table for managing the result of an array-based replication process executed in accordance with the array-based replication management table 509 (see FIG. 8). The array-based replication catalog table 511 is referenced by the replication management program 506 executed on the management computer 50.

The array-based replication catalog table 511 contains replication catalog ID 5110 for uniquely identifying an execution task of replication, backup start time 5111, replication ID 5112 for managing replication, data VOL ID 5113 having stored therein data on the application to be backed up, and backup VOL ID 5114 having stored therein backup data.

In the array-based replication catalog table 511, execution results of the array-based replication management table 509 are stored as described above. Information on the replication ID 5112, the data VOL ID 5113, and the backup VOL ID 5114 in the array-based replication catalog table 511 is acquired from the array-based replication management table 509. The backup VOL ID 5114 is selected from the backup VOL ID 5095 in the array-based replication management table 509. When more than one backup VOL IDs are registered for a single replication ID, the replication management program 506 sequentially selects them. However, the backup VOL ID can also be selected by the administrator, or any other selection methods can be used. When backup is initiated, the replication management program 506 provides the replication catalog ID 5110 and the time 5111, and stores such information in the table. However, such information can also be provided through a manual entry by the administrator.

<Secondary Replica Catalog Table>

FIG. 11 is a diagram showing an example of the secondary replica catalog table 512. The secondary replica catalog table 512 is referenced by the replication management program 506 executed on the management computer 50.

The secondary replica catalog table 512 contains replication catalog ID 5120 for uniquely identifying an execution task of replication, replication ID 5121 for managing replication, secondary-replica-data creation time 5122, replica VOL ID 5123 indicating a replica volume that has stored therein the original data for creating the secondary replica data, a secondary-replica-data storage area 5124 that identifies a storage area in which the secondary replica data is stored, and a backup flag 5125 for maintaining the consistency with the backup executed by the array-based replication. Herein, the secondary replica data refers to a replica volume created by replicating the replica volume that has been created by the host-based replication (a replica of the replica).

In the secondary replica catalog table 512, the results of execution by the replication engine 406 on the host computer (the standby server) 40 are stored. That is, data on the replica VOL having stored therein data on the replication executed in accordance with the host-based replication management table 510 (FIG. 9) is further copied to the secondary-replica-data storage area 5124.

Information on the replication ID 5121 and the replica VOL ID 5123 in the secondary replica catalog table 512 is acquired from the host-based replication management table 510. The secondary-replica-data storage area 5124 can be selected by the administrator. Alternatively, the replication management program 506 can be configured to select an unused volume with reference to the usage status 5074 in the configuration information table 507. The replication management program 506, upon storing data into the secondary-replica-data storage area 5124, stores information on the creation time 5122 and the replication catalog ID (e.g., the time when array-based replication (backup) was executed in the storage device is used as the ID). Further, the replication management program 506, upon executing backup using the array-based replication engine 116, provides the backup flag 5125.

It can be seen from FIG. 11 that when data in SSVOL001 corresponding to HRPC001 and data in SSVOL002 corresponding to HRPC002 are reflected into a replica volume (the standby server) VOL011, the replica volume in the standby server has the same data content as the replica volume in the storage device on Apr. 21, 2010 23:00.

<Concept of the Replication Process>

Figure 12:
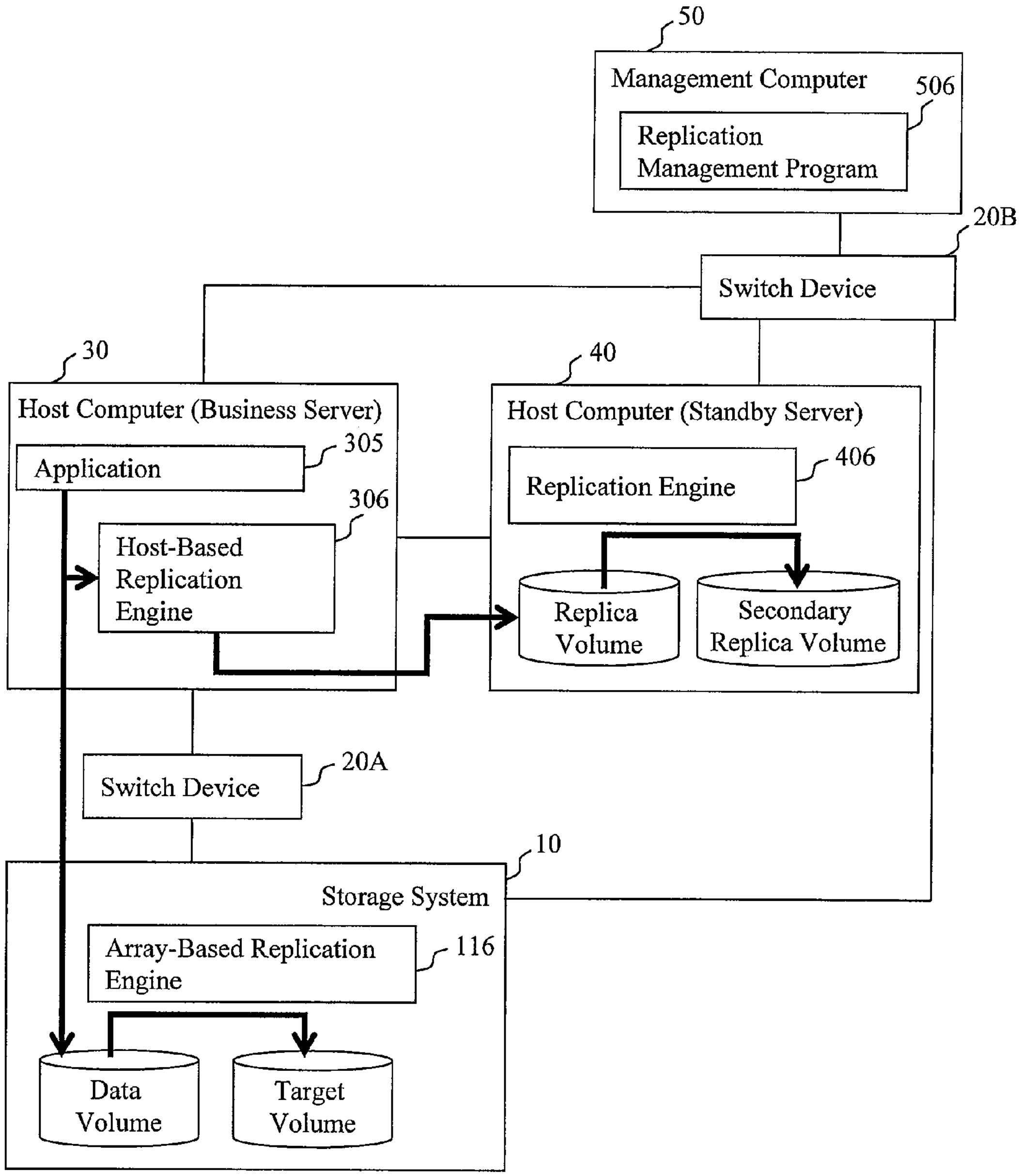
FIG. 12 is a diagram illustrating the concept of a replication process.

FIG. 12 is a diagram for illustrating a flow of the data processing in an environment that supports both host-based replication and array-based replication in accordance with this embodiment. In this embodiment, backup is executed using the array-based replication engine on the storage system 10, and replication is executed for disaster recovery using the host-based replication.

In FIG. 12, the application 305 on the host computer (the business server) 30 stores data into a data volume on the storage system 10. The replication management program 506 copies data in the data volume (a primary volume) to a target volume (a replica volume) using the array-based replication engine 116. Such data is copied at a timing when the replication management program 506 wants to store the data as backup data in accordance with the array-based replication table 509 (FIG. 8).

In addition, the replication management program 506, using the host-based replication engine 306, captures Write data from the application 305 and transfers it to a replica volume on the host computer (the standby server) 40.

Further, the replication engine 406 stores the data written to the replica volume into a secondary replica volume such as a snapshot volume so that the replica volume can be restored to its former state using the secondary replica volume.

Figure 19:
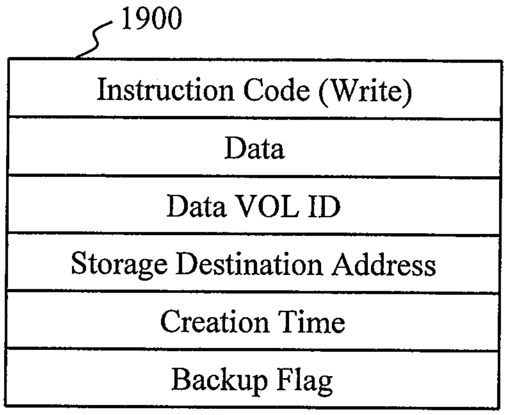
FIG. 19 is a diagram showing an exemplary configuration of Write command data.

FIG. 19 is a diagram showing an exemplary configuration of Write command data 1900. The Write command data 1900 is the data for managing the Write command. The Write command data 1900 is created when there is a change in the data used by the application 305.

The Write command data 1900 includes, for example, an instruction code, data, creation time, data VOL ID, storage-destination address, sequence number, and a backup flag.

The instruction code and the data are the information added when the application 305 issues Write data (data to be written). The data VOL ID is a field for storing the identifier of a storage-destination data VOL of the Write data. The storage-destination address is a field for storing the storage-destination address in the data volume indicated by the data VOL ID. The creation time is the time when the host-based replication engine 306 captured the Write command from the application 305.

Such values are set upon capturing the Write command from the application 305 by the host-based replication engine 306. When only the backup flag is transferred, the data is set to NULL.

<Environment Setting Process>

First, an environment setting process for setting an environment that is necessary for operating the computer system 1 will be described.

Figure 13:
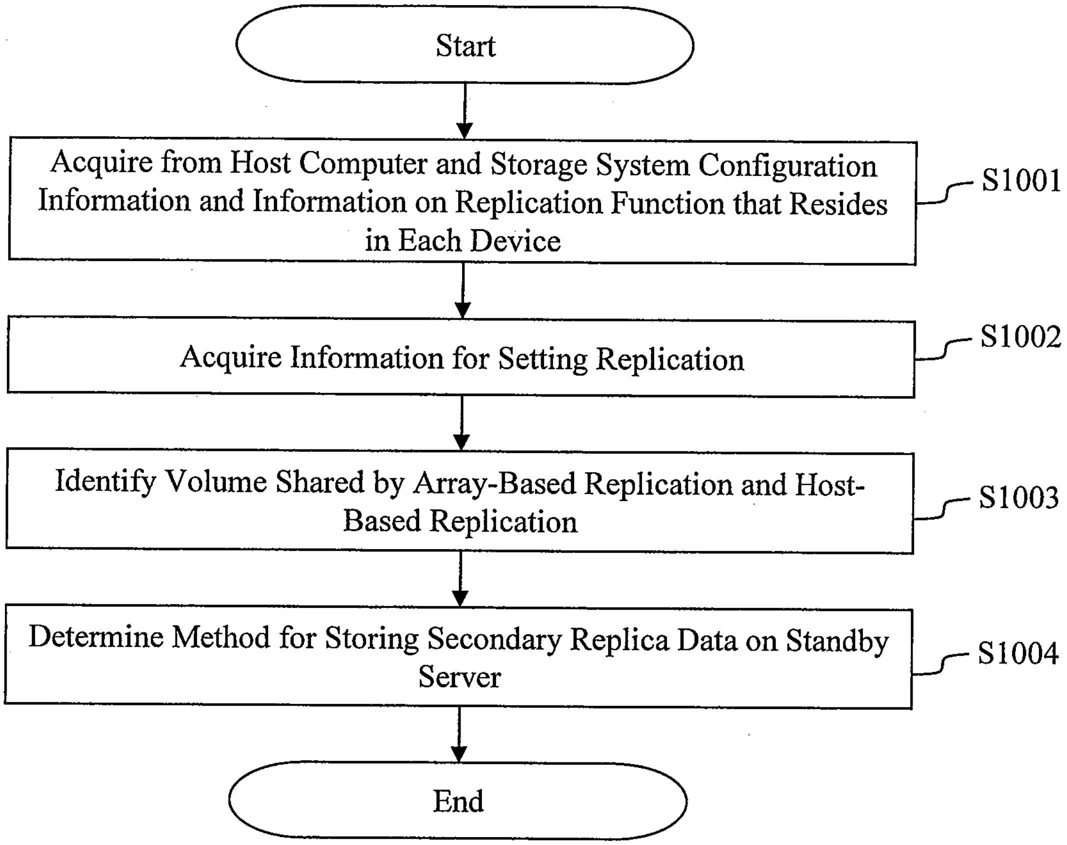
FIG. 13 is a flowchart for illustrating an environment setting process.

FIG. 13 is a flowchart for illustrating the environment setting process in accordance with this embodiment. Herein, a volume shared by the array-based replication and the host-based replication is identified so that the business can be taken over even when the volume used in the host-based replication has crashed.

In FIG. 13, processes from S1001 to S1004 are implemented by the replication management program 506 on the management computer 50 in accordance with this embodiment. These are realized by reading programs from the memory 504 by the CPU 502 and executing the processing steps. Hereinafter, some processes may be described as being performed by programs. However, in practice, such processes are performed by the CPU that is the processing unit configured to execute the programs.

i) S1001

The replication management program 506 acquires from the host computer 30 and the storage system 10 the configuration information (see FIG. 6) and information on the replication function (see FIG. 7) that resides in each device. The configuration information acquired from the storage system 10 includes information on the storage ID that identifies the storage system 10 and the volume ID that identifies a volume stored in the storage. The configuration information acquired from the host computer 30 includes information on the host ID that identifies the host computer, the application ID that identifies the application 305 running on the host computer, the volume ID that identifies a volume in which data on the application 305 is stored, the storage ID that identifies the storage system 10 to which the volume belongs, and information on the usage status. Such information is stored as the host ID, the application ID, the storage ID, and the volume ID in the configuration table 507 (FIG. 6).

In addition, the replication management program 506 acquires from each device belonging to the computer system 1 information on the replication function that resides in the device. Specifically, in this embodiment, the replication management program 506 acquires information on the array-based replication function that resides on the storage and information on the host-based replication function that resides on the host. Such information is stored as the system device ID and the replication function in the replication information table 508.

ii) S1002

The replication management program 506 acquires information for setting replication. Specifically, the replication management program 506 displays a replication setup screen and initiates a process upon instruction from the administrator. It should be noted that the screen can be operated through a graphical screen operation by means of a GUI (Graphical User Interface) or through a command entry by means of a CLI (Command Line Interface). Alternatively, a property file created by the administrator can be referenced or the replication management program 506 can be configured to automatically create a screen. The present invention is not limited to a particular setup method. Further, the information can be stored in advance in the host-based replication engine 306 or the array-based replication engine 116, and in that case, the replication management program 506 can acquire the information from each engine.

For example, when a replication setup screen is provided on a display screen of the management computer 50, the administrator registers the ID of the application 305 to be replicated using the replication setup screen. Using the setup screen, the administrator also selects the type of the replication to be set for the application 305, i.e., whether the replication is the host-based replication or the array-based replication. Then, the replication management program 506 references the replication function 5081 in the replication information table 508 from the selected replication type, and presents the replication functions that can be selected by the administrator. From such information, the administrator selects a replication function and sets it. In addition, the administrator selects a replication-destination volume using the replication setup screen.

Further, the administrator sets information on the replication schedule using the replication setup screen. Then, the replication management program 506 acquires the set information and adds it to the array-based replication management table 509 or the host-based replication management table 510 according to the replication type. The replication management program 506 also acquires the host ID and the data VOL ID by searching the configuration information table 507 on the basis of the application ID specified by the administrator, and stores the acquired information into the array-based replication management table 509 or the host-based replication management table 510.

iii) S1003

The replication management program 506 identifies a volume that is shared by the array-based replication and the host-based replication. Specifically, the replication management program 506 compares the data VOL ID 5094 registered in the array-based replication management table 509 with the data VOL ID 5103 registered in the host-based replication management table 510 to search for the presence of the identical volume, and thereby identifies a volume to which both the replication processes are executed. For example, in this embodiment, the replication management program 506 searches for the data VOL ID 5094 in FIG. 8 and the data VOL ID 5103 in FIG. 9. Then, a volume with a data VOL ID of VOL001 is found to be the volume shared by the array-based replication and the host-based replication.

iv) S1004

The replication management program 506 determines the method for storing the secondary replica data on the standby server that is the replication destination of the host-based replication. For example, when FIG. 7 is seen, the host-based CDP is found to be the replication function that resides in the HOST002 that is the replication destination of the host-based replication. Thus, the host-based CDP is used.

It should be noted that the replication management program 506 can also be configured to acquire an associated copy function from the host computer (the standby server) 40 and present a constructible environment to the administrator so that the administrator can determine the method for storing data on the standby server side.

Upon termination of the present step, the environment setting step terminates.

<Operation of Replication>

Figure 14:
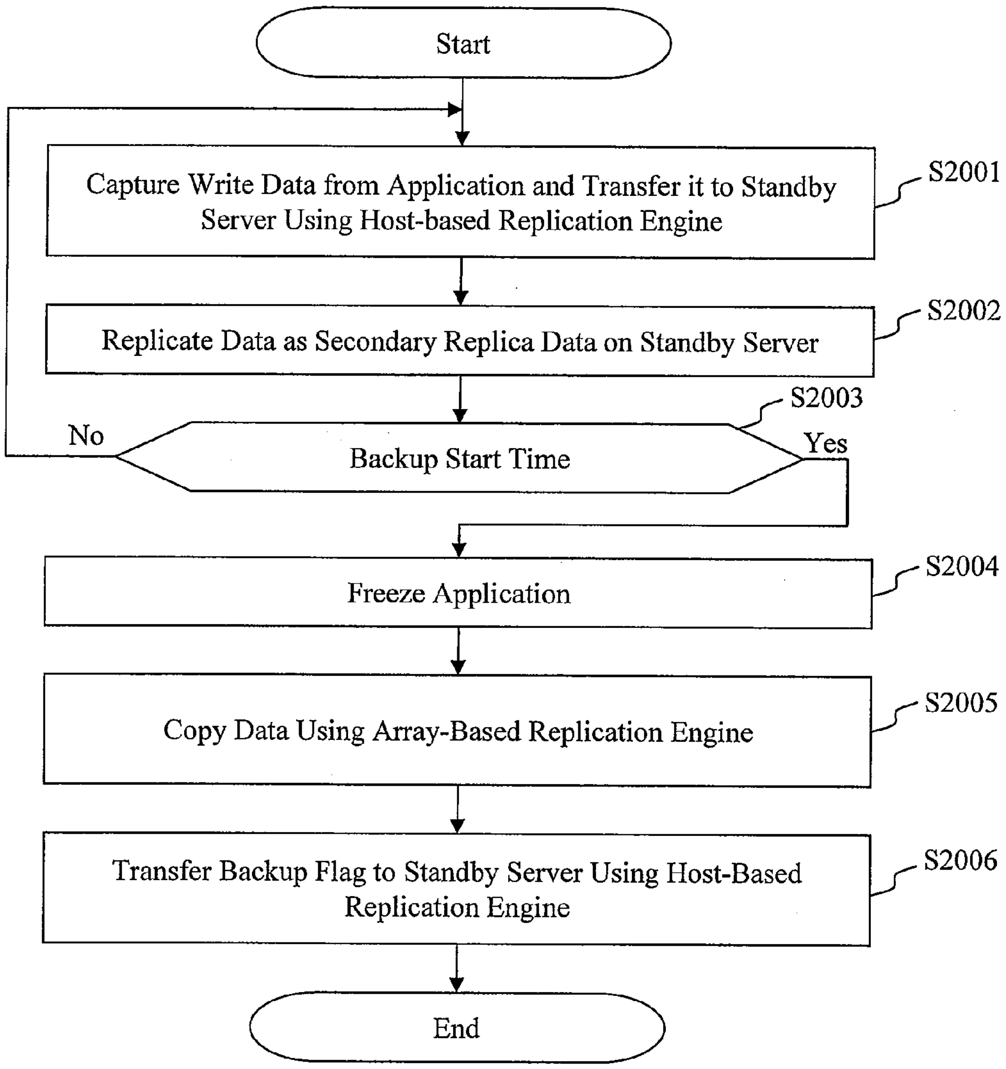
FIG. 14 is a flowchart for illustrating a system operation process.

Next, a method of backup by array-based replication and a method of data transfer by host-based replication will be described. FIG. 14 is a flowchart for illustrating the operations of the array-based replication and the host-based replication.

In FIG. 14, processes from S2001 to S2006 are implemented by the replication management program 506 on the memory of the management computer 50 in accordance with this embodiment.

i) Step S2001

The replication management program 506, using the host-based replication engine 306, captures Write data from the application 305 and transfers it to the host computer (the standby server) 40. Specifically, the host-based replication engine 306, with reference to the host-based replication management table 510, captures Write data from the application 305 and stores the data into a volume with the destination replica VOL ID in the host computer (the standby server: target host) 40.

ii) S2002

Using the replication engine 406, the replication management program 506 creates a copy of the data as the secondary replica data in the host computer (the standby server) 40 (or in a storage area provided outside the standby server 40). Each time the replication management program 506 creates the secondary replica data by copying the replica data, the necessary information is added to the secondary replica catalog table 512.

iii) S2003

The replication management program 506 checks the backup start time in the storage system 10, and repeats the processes from S2001 to S2002 until the backup start time. At the backup start time, the process proceeds to step S2004.

iv) S2004

At the backup scheduled time, the replication management program 506 freezes the application (stops the I/O process while keeping the application active). Specifically, the replication management program 506 references the backup schedule in the array-based replication management table 509, and freezes the application at the scheduled time.

v) S2005

The replication management program 506 initiates backup using the array-based replication. First, the replication management program 506 acquires a backup with the backup acquisition method set by the administrator in S1002. For example, in this embodiment, it can be seen from the replication ID ARP001 in the array-based replication management table 509 in FIG. 8 that data in the VOL001 is destined to be fully backed up to the VOL003. Thus, the data stored in the VOL001 is stored into the VOL003. The present invention is not limited to the backup method herein as the copy method can differ depending on the environment. When the backup is complete, the necessary information is added to the array-based replication catalog table 511 (FIG. 10). That is, as the replication ID is ARP 001, ARPC001 is added to the column 5110.

vi) S2006

The replication management program 506 transfers a backup flag to the host computer (the standby server) 40 using the host-based replication engine 306. Accordingly, it is possible to maintain the consistency between the data of until the flag is transferred and the data being currently backed up. In addition, the replication management program 506 provides the backup (backup in the storage system) time to the column of the backup flag 5125 in the secondary replica catalog table 512 (see FIG. 11). The replication catalog IDs: HRPC001 and HRPC002 until the backup flag is transferred have the same data as the backup data of "04/20/2010 23:00:00." After the flag is transferred, the HRPC003 that is the written data indicates the time used in the next backup.

When the data copying in S2005 and the flag transfer in S2006 are complete, the process terminates.

<Restoration Process>

A restoration process refers to the process of, when a primary volume (a data volume) and a secondary volume (a replica volume) are provided and if data in the primary volume is damaged, restoring the data in the primary volume to the data in a given point in time (when a replica was created in the secondary volume) using the secondary volume. This process differs from a business takeover process (which is described later) in which, when the primary volume has crashed, the operation of the application is restarted using a different volume (e.g., a replica volume in the standby server 40).

Figure 15:
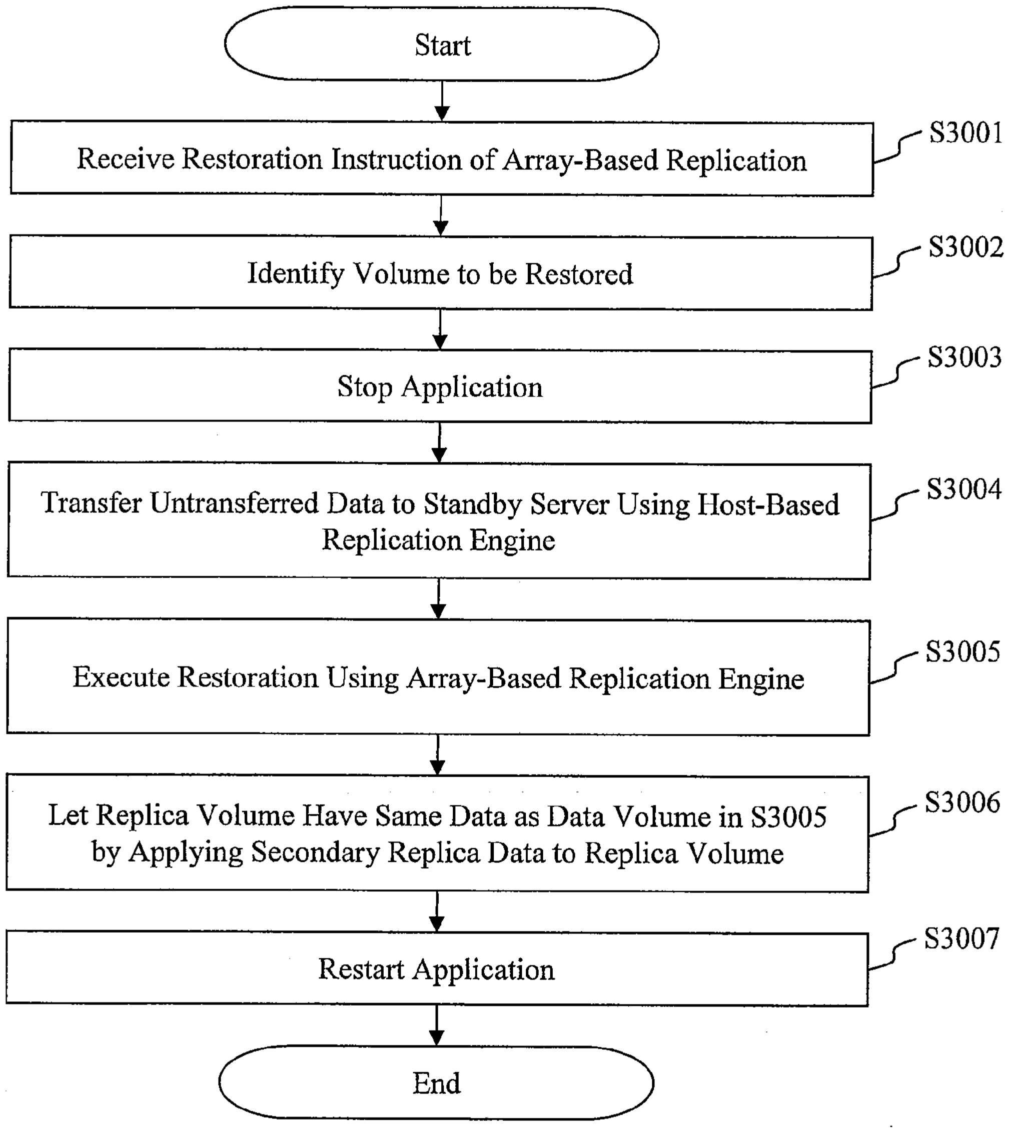
FIG. 15 is a flowchart for illustrating a restoration process.

FIG. 15 is a flowchart for illustrating a process of restoring the backed-up data by the array-based replication. It should be noted that processes from steps S3001 to S3007 in FIG. 15 are implemented by the replication management program 506 on the memory 504 of the management computer 50 in accordance with this embodiment.

i) S3001

The replication management program 506 receives a restoration instruction of the array-based replication. Specifically, for example, the administrator selects an application to be restored and issues a restoration instruction to the replication management program 506. Then, the replication management program 506 presents to the administrator the time for which restoration is possible from the array-based replication catalog table 511. For example, when the administrator issues an instruction to restore a data volume with the application ID=AP001, the replication management program 506 searches for the corresponding replication ID on the basis of the application ID=AP001 in the array-based replication management table 509, and identifies it as the ARP001. Then, the replication management program 506 recognizes that the replication catalog IDs corresponding to the replication ID=ARP001 in the array-based replication catalog 511 are ARPC001 and ARPC003. Then, the replication management program 506 presents to the administrator "04/20/2010 23:00:00" and "04/21/2010 23:00:00" as the time for which restoration is possible.

ii) S3002

Next, the replication management program 506 identifies a volume to be restored. Specifically, the replication management program 506 identifies a volume to be restored from the information on the application to be restored and the time thereof received in step S3001. For example, when the administrator has specified data with the application ID=AP001 on "04/20/2010 23:00:00," the replication management program 506 can identify from the backup VOL ID in the array-based replication catalog table 511 that the volume in which the backup data is stored is the VOL003.

iii) S3003

Then, the replication management program 505 stops the relevant application. It should be noted that either the process of step S3002 or S3003 can precede the other. That is, S3003 can be processed first.

iv) S3004

The replication management program 506 transfers untransferred data to the host computer (the standby server) 40 using the host-based replication engine 306. This process is the process of discharging data that has accumulated in the host computer (the business server) 30 without the transfer by the host-based replication engine 306. Performing such a process allows the data in the data VOL to coincide with the data in the replica VOL when the application 305 is stopped. More specifically, the replication management program 506 searches for the application specified by the administrator from the application ID in the host-based replication management table 510, identifies the target host ID and the replica VOL ID, and then transfers the data to the identified volume.

v) S3005

The replication management program 506 executes a restoration process using the array-based replication engine 116. Specifically, the replication management program 506 copies the volume (e.g., VOL003) identified in S3002 to the data volume.

vi) S3006

The replication management program 506 lets the replica volume have the same data content as the data volume restored in S3005 by applying the data in the secondary replica volume to the replica volume. More specifically, the replication management program 506 applies the data in the secondary replica volume to the replica volume so that the replica volume on the host computer (the standby server) 40 has the same content as the backup data (the secondary volume) created at the specified time.

In order to apply the data in the secondary replica volume, the replication management program 506 references the backup flag in the secondary replica catalog table 512, and identifies the secondary-replica-data storage area 5124 to be applied. For example, in the secondary replica catalog table 512 of FIG. 11, the secondary-replica-data storage areas "SSVOL001" and "SSVOL002" corresponding to the backup flag "04/21/2010 23:00:00" can be identified. Then, the replication management program 506 determines the data restoration method from the information on the method for storing the secondary replica data, and restores the data to the volume with a replica VOL ID of VOL011.

vii) S3007

The replication management program 506 restarts the application that has been stopped in step S3003. This is because the processes in S3005 and S3006 have been completed with the data volume having the same data as the replica volume. As described above, since the data volume in the storage system 10 is allowed to have the same data content as the replica volume in the host computer (the standby server) 40, there is no possibility that data in the replica volume would be damaged even if Write data of the application is generated and the data is transferred to the host computer (the standby server) 40 by the host-based replication 306.

After the application is restarted, the restoration process terminates.

<Business Takeover Process>

Figure 16:
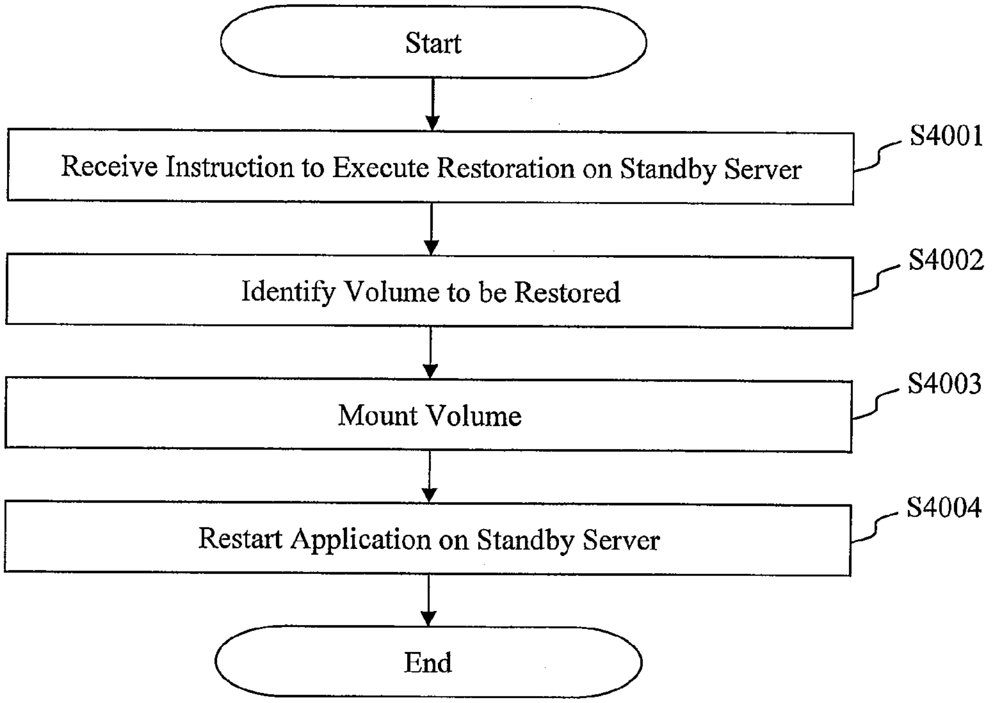
FIG. 16 is a flowchart for illustrating a business takeover process.

Next, a business takeover process that uses the data replicated by the host-based replication in accordance with this embodiment will be described. FIG. 16 is a flowchart for illustrating a business takeover process in accordance with this embodiment. In FIG. 16, processes from step S4001 to step S4004 are implemented by the replication management program 506 on the memory 504 of the management computer 50 in accordance with this embodiment.

i) S4001

The replication management program 506 receives an instruction to take over business in the host computer (the standby server) 40. Specifically, the administrator selects for the replication management program 506 a host computer and its application whose business is to be taken over, and instructs the host computer (the standby server) 40 to take over the business. That is, when the host computer (the business server) 30 has crashed, for example, the administrator selects the host computer whose business is to be taken over to continuously perform the business, displays applications belonging to the host, and selects and identifies an application whose business is to be continuously taken over from among the displayed applications.

ii) S4002

The replication management program 506 identifies a volume to take over the business. Specifically, the replication management program 506 identifies a volume to take over the business from the host and its application whose business is to be taken over, which has been received in S4001. The administrator can identify the target host ID 5104 and the replica VOL ID 5105 from the application ID 5101 in the host-based replication management table 510. For example, it can be seen that data on the AP0011 on the HOST001 whose business is to be taken over is stored in the VOL011 on the HOST002.

iii) S4003

The replication management program 506 mounts the identified volume.

iv) S4004

The replication management program 506 restarts the application on the host computer (the standby server) 40 using the volume mounted in S4003. Thus, even when the host computer (the business server) 30 and the storage system 10 having the data stored therein have crashed, the business can be restarted using the host computer (the standby server) 40. Further, even when the system has gone down during a transfer process of the host-based replication, data that can take over the business can be applied by using the data in the secondary replica volume on the host computer (the standby server) 40.

(2) Second Embodiment

The second embodiment of the present invention differs from the first embodiment in which data on the application 305 is captured on the host computer 30 in the computer system 1, in that data on the application 305 is captured with the switch device 20. This embodiment will describe a case in which the present invention is applied to such an environment, centering on the difference from the configuration in FIG. 1.

<System Configuration>

Figure 17:
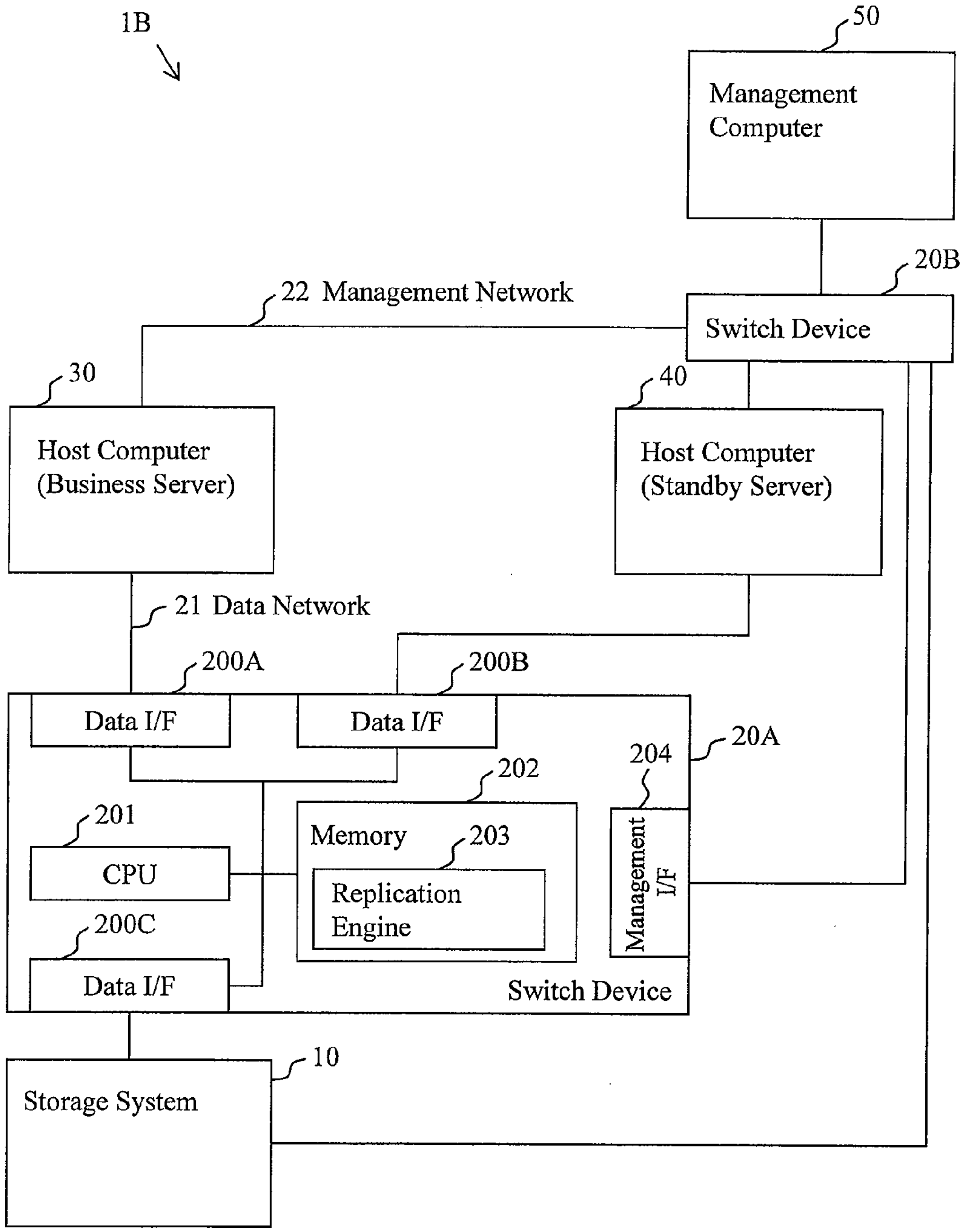
FIG. 17 is a block diagram showing the schematic configuration of a computer system 1B.

FIG. 17 is a diagram showing the schematic configuration of a computer system 1B in accordance with this embodiment. As shown in FIG. 17, the computer system 1B in this embodiment includes a storage system 10, a switch device 20, a host computer (a business server) 30, a host computer (a standby server) 40, and a management computer 50 as in FIG. 1.

The storage system 10, the host computers 30 and 40, and the management computer 50 have the same configurations as those in the first embodiment.

The system configuration in FIG. 17 differs from that in FIG. 1 in that a replication engine 203 is stored on the switch device 20. In addition, the host-based replication engine 306 need not be provided on the memory 304 of the host computer (the business server) 30.

More specific configuration of the switch device 20 will be described. The switch device 20 includes a data I/F 200, a CPU 201, memory 202, and a management I/F. The data I/F 200 is an interface to the data network 21, and has one or more communication ports. The host computer (the business server) 30 and the host computer (the standby server) 40 transmit/receive data to/from the storage system 10 via the port(s). Although three data I/Fs are shown in the drawing, the number of the data I/Fs is not limited. The management I/F 204 is an interface to the management network 22, and has one or more communication ports via which communication with the switch device 20B can be performed.

The CPU 201 is a processor that executes programs stored in the memory 202. The replication engine 203 is stored in the memory 202. These are executed by the CPU 201. The replication engine 203 captures data to be written to the storage system 10 from the application 305 on the host computer (the business server) 30, and transfers the data to the host computer (the standby server) 40 via the data I/F 200B.

Each information used in this embodiment is the same as that stored in each table of FIG. 6 to FIG. 11 described in the first embodiment. In the replication information table 508 in this embodiment, "asynchronous remote replication" is entered as the replication function 5081 of the system device ID 5080: "switch" in FIG. 7, for example.

<Processing Operation>

Next, the process of this embodiment will be described. The specific process is implemented by the processes in FIGS. 13, 14, 15, and 16 as in the first embodiment. However, the process in the following step is changed.

That is, in step S2001, the replication management program 506 on the memory 504 of the management computer 50 captures Write data from the application 305 using the replication engine 203 on the memory 202 on not the host computer (the business server) 30 but the switch device 20A, and transfers the data to the standby server. Other than that, the processes performed by the host-based replication engine 306 are executed by the replication engine 203 on the switch device 20. In addition, the replication management program 506 issues instructions to the replication engine on not the host computer (the business server) 30 but the switch device 20.

(3) Third Embodiment

The third embodiment differs from the first embodiment in that a NAS (Network Attached Storage) device 60 is provided instead of the host computers 30 and 40 included in the computer system 1 in accordance with the first embodiment. In the NAS device 60, a file system program 604 is stored on memory 603 and functions as a file server. This embodiment will describe a case in which the present invention is applied to the NAS environment, centering on the difference from the configuration in FIG. 1.

<System Configuration>

Figure 18:
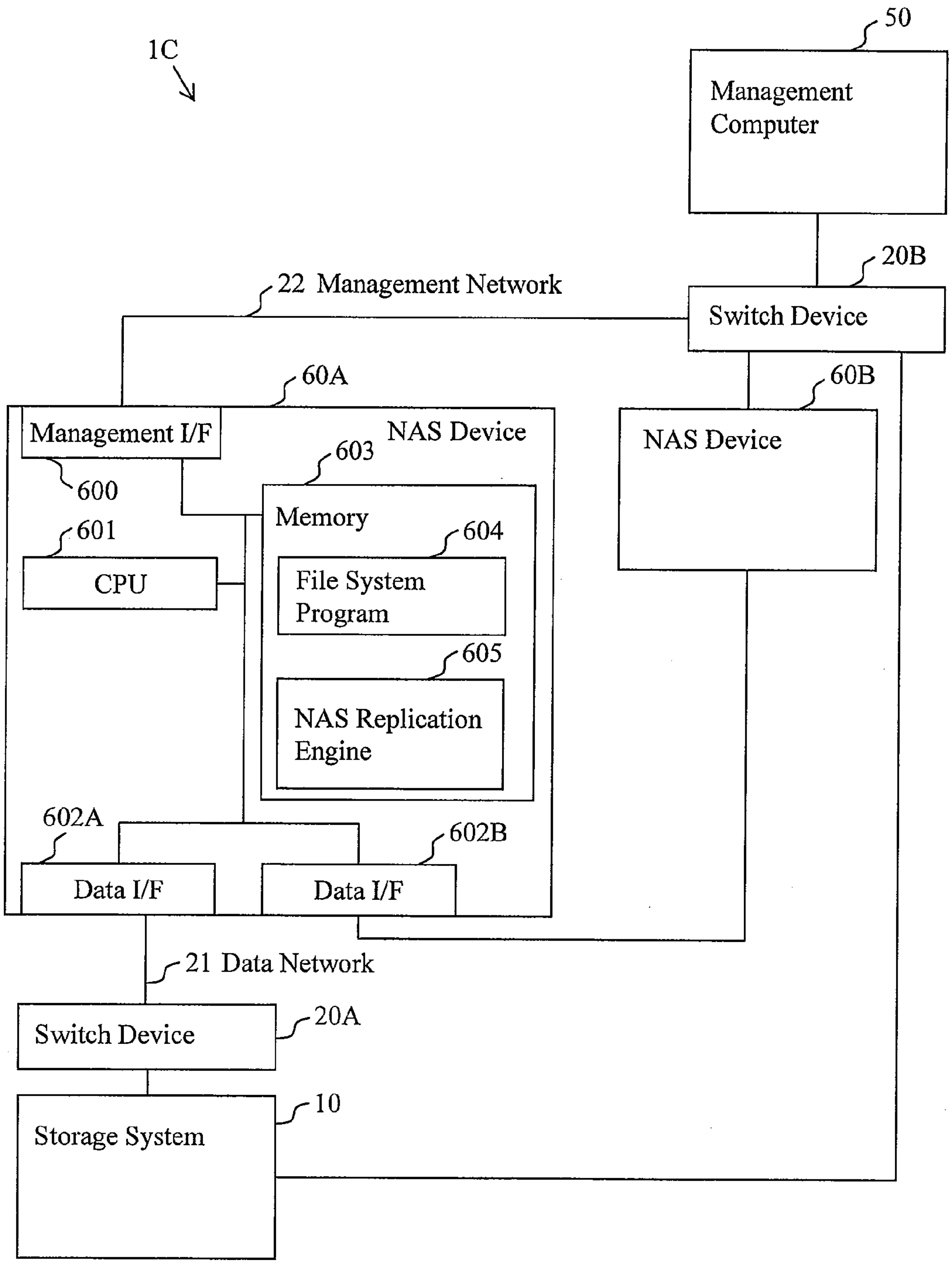
FIG. 18 is a block diagram showing the schematic configuration of a computer system 1C.

FIG. 18 is a diagram showing the schematic system configuration of a computer system 1C including the NAS device 60 in accordance with this embodiment. As shown in FIG. 18, the computer system 1C in accordance with this embodiment includes a storage system 10, a switch device 20, the NAS device 60, and a management computer 50. The storage system 10, the switch device 20, and the management computer 50 have the same internal configurations as those in the first embodiment. The system configuration in FIG. 18 differs from that in the first embodiment in that each of the host computers 30 and 40 is replaced by the NAS device 60.

The internal configuration of the NAS device 60 will be described. The NAS device 60 includes a management I/F 600, a CPU 601, a data I/F 602, and memory 603. The management I/F 600 is an interface to the management network 22, and has one or more communication ports. The NAS device 60 transmits and receives data or control instructions to/from the management computer 50 via the port(s). The CPU 601 is a processor that executes programs stored in the memory 603. The data I/F 602 is an interface to the data network 21, and has one or more communication ports. The data I/F 602A transmits and receives data to/from the storage system 10. The data I/F 602B transmits and receives data to/from the NAS device 60B.

The memory 603 has stored therein the file system program 604 and a NAS replication engine 605. These are executed by the CPU 601. The file system program 604 is a program that manages the file system. The NAS replication engine 605 captures data to be written to the storage system 10 from the file system program 604 and transfers the data to the NAS device 60B via the data I/F 602B.

Each information used by the computer system 1C in this embodiment is the same as that stored in each table shown in FIG. 6 to FIG. 11 in the first embodiment. However, the application needs to be replaced by the file system. The NAS replication engine 605 transfers data on a file-by-file basis.

<Processing Operation>

For the processing operation of the computer system 1C in accordance with this embodiment, the processes shown in FIGS. 13, 14, 15, and 16 can be applied as in the first embodiment. However, the application 305 is replaced by the file system program 604, and the host-based replication engine 306 is replaced by the NAS replication engine 605.

The NAS replication engine 605 on the NAS device 60A captures data to be written to the storage system 10 from the file system program 604, transfers it to the NAS device 60B via the data I/F 602B, and creates a replica volume in the NAS device 60B as in the first embodiment. Then, the replication engine on the NAS device 60B creates a secondary replica volume that is a replica of the replica volume.

(4) Conclusion

As described above, the computer system in accordance with the embodiment of the present invention includes a first computer (the host computer 30, the switch device 20A, or the NAS device 60A), a second computer (the host computer 40 or the NAS device 60B), a storage system, and a management computer. In the storage system, backup data (replica) of a first storage area (a primary volume) is created by array-based replication at a given timing (e.g., a replication schedule specified by the management computer), and is then stored into a second storage area (a secondary volume). Meanwhile, in the first computer, host-based replication is executed so that the replica data in the first storage area is stored into a third storage area (a replica volume) in the second computer. In the second computer, replication (which need not be host-based replication) is executed so that a replica of the replica volume is stored into a fourth storage area (a secondary replica volume) as the secondary replica data. Then, when a process of restoring the primary volume is performed using the secondary volume for some reason such as when a defect in the data in the primary volume has occurred, the secondary replica data is applied to the replica volume so that the replica volume in the second host computer has the same data content as the primary volume after the restoration process. Accordingly, even after the primary volume is restored, the replica volume would not be damaged by the host-based replication, and thus it is possible to provide an environment that supports both host-based replication and array-based replication while maintaining the consistency between the two replications.

More specifically, the backup time, which indicates the time when the array-based replication was executed in the storage system to store a backup of the first storage area into the second storage area, and the secondary replica update time, which indicates the time when a replica of the data to be written that has been captured by the execution of the host-based replication was added to the fourth storage area as the secondary replica data, are managed. Thus, it is possible to know at which backup time the data to be written, which was added to the fourth storage area at the secondary replica update time, was backed up to the second storage area (see FIG. 11). Then, the management computer applies the data in the fourth storage area (the secondary replica volume), which corresponds to the backup time of the data in the second storage area (the secondary volume) used in the restoration process, to the data in the third storage area (the replica volume). Accordingly, even when writing is frequently performed to the primary volume from the application, and the data content of the secondary volume greatly differs from that of the replica volume, it is possible to maintain the consistency between the content of the secondary volume used in the restoration process and that of the replica volume when a restoration process is performed.

It should be noted that the present invention can also be realized by a program code of software that implements the functions of the embodiments. In such a case, a storage medium having recorded thereon the program code is provided to a system or an apparatus, and a computer (or a CPU or a MPU) in the system or the apparatus reads the program code stored in the storage medium. In this case, the program code itself read from the storage medium implements the functions of the aforementioned embodiments, and the program code itself and the storage medium having recorded thereon the program code constitute the present invention. As the storage medium for supplying such a program code, for example, a flexible disk, CD-ROM, DVD-ROM, a hard disk, an optical disc, a magneto-optical disc, CD-R, a magnetic tape, a nonvolatile memory card, ROM, or the like is used.

Further, based on an instruction of the program code, an OS (operating system) running on the computer or the like may perform some or all of actual processes, and the functions of the aforementioned embodiments may be implemented by those processes. Furthermore, after the program code read from the storage medium is written to the memory in the computer, the CPU or the like of the computer may, based on the instruction of the program code, perform some or all of the actual processes, and the functions of the aforementioned embodiments may be implemented by those processes.

Moreover, the program code of the software that implements the functions of the embodiments may be distributed via a network, and thereby stored in storage means such as the hard disk or the memory in the system or the apparatus, or the storage medium such as CD-RW or CD-R, and at the point of use, the computer (or the CPU or the MPU) in the system or the apparatus may read the program code stored in the storage means or the storage medium and execute the program code.

The invention claimed is:

1. A computer system comprising:

a first computer;

a second computer;

a storage system including a plurality of storage areas; and a management computer configured to manage the first and second computers and the storage system, wherein the storage system includes a first storage area configured to have stored therein data, and a second storage area configured to have stored therein backup data of the first storage area at a backup time indicating when the data of the first storage area is backed up in the second storage area, the first computer captures the data to be written to the first storage area and transfers the captured data to the second computer, the second computer includes a third storage area configured to have stored therein the captured data from the first computer as replica data of the first storage area, and a fourth storage area configured to have stored therein replica data of the third storage area as secondary replica data, and the management computer manages the backup time in association with a secondary replica data update time indicating when the replica data of the third storage area was stored to the fourth storage area, and the management computer, in response to performing a restoration process to the first storage area using the backup data in the second storage area, applies one or more parts of the secondary replica data in the fourth storage area, by referring to the backup time of the backup data of the second storage area used for the restoration process to the first storage area and the secondary replica update time, to the replica data in the third storage area so that the third storage area has the same data as the first storage area after the restoration process.

2. A computer system according to claim 1, wherein the management computer applies the one or more parts of the secondary replica data in the fourth storage area corresponding to the backup time of the backup data in the second storage area used in the restoration process to the replica data in the third storage area.

3. A computer system according to claim 2, wherein the first computer is a business server and the second computer is a standby server, the business server includes an application configured to use the first storage area, and a first replication engine configured to execute host-based replication to capture the data to be written to the first storage area from the application and transfer the captured data to the standby server, the standby server includes a second replication engine configured to store the replica data in the third storage area into the fourth storage area as the secondary replica data, and the storage system includes an array-based replication engine configured to execute array-based replication to store the backup data of the data in the first storage area into the second storage area in accordance with a predetermined schedule.

4. A computer system according to claim 2, further comprising a business server including an application configured to use the first storage area, wherein the first computer is a switch device and the second computer is a standby server, the switch device includes a first replication engine configured to execute replication to capture the data to be written to the first storage area from the application and transfer the captured data to the standby server, the second computer includes a second replication engine configured to store the replica data in the third storage area into the fourth storage area as the secondary replica data, and the storage system includes an array-based replication engine configured to execute array-based replication to store the backup data of the data in the first storage area into the second storage area in accordance with a predetermined schedule.

5. A computer system according to claim 2, wherein the first computer is a first Network Attached Storage (NAS) device and the second computer is a second NAS device, the first NAS device includes a processor configured to manage a file system that uses the first storage area in accordance with a file system program, and a first replication engine configured to execute replication to capture the data to be written to the first storage area from the file system program and transfer the captured data to the second NAS device, the second NAS device includes a second replication engine configured to store the replica data in the third storage area into the fourth storage area as the secondary replica data, and the storage system includes an array-based replication engine configured to execute array-based replication to store the backup data of the data in the first storage area into the second storage area in accordance with a predetermined schedule.

6. A computer system according to claim 1, wherein the management computer displays on a display device a setup screen for setting a method of creating the replica data of the third storage area and storing the replica data into the fourth storage area.

7. A system control method for controlling a computer system, the computer system including:

a first computer, a second computer, a storage system including a first storage area configured to have stored therein data, and a second storage area configured to have stored therein backup data of the first storage area at a backup time indicating when the data of the first storage area is backed up in the second storage area, and a management computer configured to manage the first and second computers and the storage system, the first computer captures the data to be written to the first storage area and transfers to the second computer the captured data, the second computer including a third storage area configured to have stored therein the captured data from the first computer as replica data of the first storage area, and a fourth storage area configured to have stored therein replica data of the third storage area as secondary replica data, and the management computer manages the backup time in association with a secondary replica update time indicating when the replica data of the third storage area was stored to the fourth storage area, the method comprising the following steps executed by the management computer:

executing a restoration process to the first storage area using the backup data in the second storage area; and applying, in response to executing the restoration process, one or more parts of the secondary replica data in the fourth storage area, by referring to the backup time of the backup data of the second storage area used for the restoration process to the first storage area and the secondary replica update time, to the replica data in the third storage area so that the third storage area has the same data as the first storage area after the restoration process.

8. A system control method according to claim 7, wherein the management computer applies the one or more parts of the secondary replica data in the fourth storage area corresponding to the backup time of the backup data in the second storage area used in the restoration process to the replica data in the third storage area.

9. A system control method according to claim 7, further comprising the following step executed by the management computer:

displaying on a display device a setup screen for setting a method of creating the replica data of the third storage area and storing the replica data into the fourth storage area.

10. A system control method according to claim 7, further comprising the following step executed by the management computer:

mounting the replica data in the third storage area in response to an instruction to perform a process of taking over business of the first storage area.

* * * * *